Patented Dec. 25, 1951

2,580,068

UNITED STATES PATENT OFFICE 2,580,068

PROCESS OF REMOVING SULFUR COMPOUNDS AND CARBON MONOXIDE FROM HYDROGEN

John S. Beekley, Wilmington, Del., and Walter E. Vail, Charleston, W. Va., assignors to E. I. du Pont de Nemours & Company, Wilmington, Del., a corporation of Delaware No Drawing. Application April 29, 1947, Serial No. 744,804

5 Claims. (Cl. 23—210)

This invention relates to a method of purifying gases containing sulfur compounds and carbon monoxide by passing them through a series of purifiers containing co-acting catalysts, the invention being more particularly directed to the removal of sulfur compounds and carbon monoxide from hydrogen by a catalytic sulfur removal process and a methanation process.

A number of processes have been provided for the removal of sulfur from gases, such for example, as chemical absorption involving the reaction of the sulfur contained in the gas with an absorbent, which may hold the sulfur loosely in a chemical complex, or may combine firmly with the sulfur. Some processes involve, first converting the sulfur compounds to other compounds more readily separated from the gas, such processes generally involving catalysis. Various means, likewise, have been employed for providing carbon monoxide-free gases such, for example, as scrubbing with copper liquors. Catalytic processes have likewise been provided involving, for example, what is called the methanation process in which the carbon monoxide reacts with hydrogen to form methane and water, the methane being relatively less harmful than carbon monoxide in subsequent utilization of the gas.

An object of the present invention is to provide a process for removing small concentrations of sulfur compounds as well as carbon monoxide from a gas containing them. Another object is to provide a process for separating sulfur compounds and carbon monoxide from hydrogen by a process involving a sulfur removal step and a methanation step, the sulfur removal step likewise starting methanation which is completed by a subsequent methanation step for removal of carbon monoxide. Another object is to provide a process wherein sulfur compounds and carbon monoxide are removed from hydrogen by an over-all adiabatic process. Other objects and advantages of the invention will hereinafter appear.

According to the invention, gases containing sulfur compounds and carbon monoxide, and more particularly hydrogen containing these impurities, are freed from them by a two-step process, in the first step of which the sulfur is removed and some carbon monoxide is hydrogenated to methane, and in the second step substantially all of the remaining carbon monoxide is removed by methanation. Another feature of the invention particularly directed to the purification of hydrogen involves restricting the carbon monoxide content of the hydrogen to such an extent prior to methanation that the combination of the sulfur removing and methanation reactions is substantially adiabatic. Other objects and advantages of the invention will hereinafter appear.

The removal of last traces of carbon monoxide from a gas is quite difficult and this is especially so if a gas containing 10 parts per million or less of carbon monoxide is the goal. It has been found that by a combination of sulfur removal and methanation it is possible to attain this near perfection providing a sulfur removal and especially a sulfur removal and methanation combination catalyst is employed, which together with a separate methanation catalyst thoroughly remove the carbon monoxide down to 10 parts per million or less.

In the first sulfur or sulfur-carbon monoxide removal combination step of the invention, the contaminated gas is passed over a catalyst which is capable of performing the sole or dual function. Sulfur removal catalysts are well-known, such as reduced copper, copper chromite, iron oxide, iron oxide plus alkali, etc. Dual purpose catalysts especially fitted are the copper-zinc catalysts that preferably contain less than 0.015% sulfur.

Such copper-zinc catalysts are prepared by the coprecipitation of copper and zinc carbonate in a ratio of 0.5 to 3 zinc to one copper on a weight basis and preferably 2 zinc to 1 copper, from a clear solution of the sulfates using 10% in excess of sodium carbonate solution over that stoichiometrically required. The precipitated carbonates are filtered, dried and ignited to the oxide, thoroughly washed to reduce sulfur content below 0.015%, redried, mixed with 0.5% graphite and pilled. In this form the catalyst is ready for charging into the converter.

The sulfur is removed and methanation of a portion of the carbon monoxide effected by passing the contaminated gas, which generally contains the sulfur in a chemically combined form, over the reduced solid copper-zinc catalyst, at a temperature between 200 and 400° C. and under pressures between 100 and 500 lbs./sq. in.

After the aforesaid combination sulfur removal-methanation step, or a simple known sulfur removal step, the gas which contains less than about 0.005 grain of sulfur per 100 cubic feet and generally less than .001 grain per 100 cubic feet, is passed directly and preferably as quickly as possible to the major methanation step. This step is conducted at essentially the temperature and pressure used in the combination step and, preferably, the methanation is accomplished by passing the carbon monoxide contaminated gas over a suitable methanation catalyst, such for example, as a metal of the iron group, and particularly nickel, iron, or cobalt, or mixtures thereof, containing a suitable activator such as an alkali metal, an alkaline earth metal or an oxide of chromium. The preferred catalyst for the removal of carbon monoxide by methanation from hydrogen is a nickel chromite catalyst which is peculiarly well adapted for carbon monoxide clean up down to 10 parts per million or less.

The above preferred catalyst may be a pelleted nickel chromite catalyst having a molar ratio of about 1 nickel to 1 chromium. This catalyst may be prepared by precipitating basic nickel ammonium chromate from a hot solution of nickel nitrate and chromic acid by the addition of anhydrous ammonia. The precipitate is filtered, washed, ignited without prior drying and the ignited powder kneaded to obtain a dense paste. The kneaded paste is then dried, granulated and the granulated powder mixed with a lubricant such as graphite or a vegetable stearate in amounts ranging from 0.5 to 5.0% based on the weight of powder. This mixture is then pilled to the desired size. In this form it is ready for positioning in the converter in which the methanation reaction is conducted.

As is implied from the above, the sulfur removal and carbon monoxide removal are, for optimum results, conducted in a single converter, preferably of the tray type, containing a series of trays, one above the other, the gas first passing through the trays containing sulfur removal catalyst and then through the trays holding the methanation catalyst. A method which has proven to be very efficient involves the use of a converter having the upper trays provided with sulfur removal catalysts and the lower trays with methanation catalysts, the gas passing downward through the sulfur removal trays and then through the trays containing methanation catalyst. The converter is maintained at a temperature between about 200 and 400° C. and preferably between 300 and 375° C. and under a pressure between 100 and 500 lbs./sq. in gage. In a properly regulated process no heat need be provided, for the exothermicity of the methanation reaction is sufficient, with the aid of heat exchange, to maintain autothermal operation. In order to provide such conditions, and in as much as the methanation reaction is highly exothermic, it is advisable to introduce into the converter a gas containing not more than about 2½% by volume of carbon monoxide, for, otherwise, cooling coils within the converter would be necessary to hold the temperature of the catalyst beds within this desirable range. To assist in accomplishing this result, the inlet gas is usually held to a carbon monoxide content between 0.5 and 1.5%.

The examples which follow illustrate preferred embodiments of the invention.

*Example 1.*—A gas at 25 atmospheres pressure and containing 94% hydrogen, 3% CO, 0.4% $CH_4$ and 2.6% $N_2$ by volume and 0.01 grain organic sulfur per 100 cubic feet is treated with copper liquor in such a way as to lower the CO concentration to 1%. This gas is then passed through heat exchangers in which it is heated to 300° C. and into a converter where it passes first through two trays of reduced copper-zinc catalyst made as previously described, and then through three trays of reduced nickel chomite catalyst. Gas space velocity with respect to the nickel chomite is 6000 cu. ft./hr./cu. ft. catalyst. The effluent gas at approximately 370° C. is cooled through the aforementioned heat exchangers, further cooled indirectly by water, separated from the water formed in the converter by the methanation of CO, and then is ready for use. The purified gas contains in the order of 0.001 grain sulfur per 100 cubic feet and 0.001% CO by volume. The sulfur-removing copper-zinc catalyst should be replaced with fresh catalyst annually. When fresh, this catalyst accounts for methanation of about one-third of the CO entering the converter.

*Example 2.*—A gas at 25–30 atmospheres pressure, and containing 73.1% $H_2$, 24.4% $N_2$, 2% CO, 0.2% $CH_4$ and 0.3% A by volume and 0.03 grain organic sulfur per 100 cubic feet, is passed through heat exchangers in which it is heated to 230°–250° C., and into a converter where it passes first through three trays of reduced copper-zinc catalyst made as previously described, and then through three trays of reduced nickel chromite catalyst. Gas space-velocity with respect to the nickel chromite catalyst is 6000 cu. ft. per hr. per cu. ft. catalyst. The effluent gas at 370–390° C. is used to heat the inlet gas, is then cooled, separated from the water formed in the converter by the methanation of CO, and is ready for use. The purified gas contains in the order of 0.001 grain sulfur per 100 cubic feet, and 0.001% CO by volume. The sulfur-removing copper-zinc catalyst should be replaced with fresh catalyst annually.

It appears to be immaterial what process is used for the initial lowering of the carbon monoxide content of the gas treated to one containing in the order of 2½% carbon monoxide, for catalytic processes which convert the carbon monoxide to alcohol, aldehydes or other organic compounds, or processes which merely involve absorption, may be used. Copper-liquor scrubbing has already been mentioned as well adapted for this purpose.

While the examples illustrate the invention in terms of purifying a gas containing principally hydrogen from sulfur and carbon monoxide, the process is likewise applicable to other gaseous mixtures in which there is a large excess of hydrogen to form methane with the carbon monoxide present and sufficient sulfur to necessitate its removal by way of the sulfur removal process described.

We claim:

1. In a process of purifying a hydrogen-rich substantially oxygen free gas containing sulfur compounds and carbon monoxide, the step which comprises passing the impure gas into a reaction zone at a temperature between 200 and 400° C. and under a pressure between 100 and 500 lbs./sq. in. gauge over a copper-zinc carbon monoxide and sulfur removal catalyst and, substantially immediately thereafter and without substantial changes in temperature and pressure conditions, over a methanation catalyst.

2. In a process of removing sulfur compounds and carbon monoxide from hydrogen, the steps which comprise removing the sulfur compounds by a carbon monoxide and sulfur removal catalyst containing 0.5 to 3.0 parts by weight of zinc per part by weight of copper and the carbon monoxide by a methanation catalyst, the carbon monoxide and sulfur removal reaction and the methanation reaction being conducted by passing the contaminated gases over the catalysts at a temperature between 200 and 400° C. and under a pressure between 100 and 500 lbs./sq. inch, the amount of carbon monoxide in the gas prior to treatment being such that the reactions are substantially adiabatic.

3. The process of claim 2 in which the gas treated contains from 0.5 to 2.5% carbon monoxide.

4. The process of claim 2 in which the carbon monoxide content of the gas prior to treatment is between 0.7 and 1.5%.

5. In a process of purifying a hydrogen-rich substantially oxygen free gas containing sulfur compounds and carbon monoxide, the step which comprises passing the impure gas into a reaction zone at a temperature between 200 and 400° C. and under a pressure between 100 and 500 lbs. per sq. in. gauge, the gas first being passed in said zone over a copper-zinc catalyst for the removal of carbon monoxide and sulfur and substantially immediately thereafter and without material change in temperature over a nickel-chromite catalyst for the removal of carbon monoxide.

JOHN S. BEEKLEY.
WALTER E. VAIL.

REFERENCES CITED

The following references are of record in the file of this patent:

UNITED STATES PATENTS

| Number | Name | Date |
| --- | --- | --- |
| 1,801,382 | Wietzel | Apr. 21, 1931 |
| 1,818,615 | Gluud | Aug. 11, 1931 |
| 1,900,751 | Baehr | Mar. 7, 1933 |
| 2,074,311 | Moore | Mar. 16, 1937 |
| 2,353,600 | Sweetser | July 11, 1944 |
| 2,435,551 | Black | Feb. 3, 1948 |